Sept. 2, 1924.

C. A. CLAFLIN 1,507,230

HOSE COUPLING

Filed July 29, 1920

INVENTOR:
C. A. Claflin
by Hugh A. Brown Quimby May
ATTYS.

Patented Sept. 2, 1924.

1,507,230

UNITED STATES PATENT OFFICE.

CHARLES A. CLAFLIN, OF MEDFORD, MASSACHUSETTS.

HOSE COUPLING.

Application filed July 29, 1920. Serial No. 399,732.

*To all whom it may concern:*

Be it known that I, CHARLES A. CLAFLIN, a citizen of the United States, residing at Medford, in the county of Middlesex and State of Massachusetts, have invented new and useful Improvements in Hose Couplings, of which the following is a specification.

This invention relates to a fluid-conducting coupling, adapted to connect two sections of a conduit, such as a fixed conduit section and a length of flexible hose, or two lengths of flexible hose, the coupling being composed of a female member adapted for connection with one conduit section, and a male member, adapted for connection with the other conduit section.

The object of the invention is to provide improved means, whereby said members may be quickly, conveniently, and securely interengaged and separated.

The invention is embodied in the improvements hereinafter described and claimed, permitting the interengagement of the members by two manual movements of the operator, followed by an automatic movement of one of said members completing the interengagement.

Of the accompanying drawings forming a part of this specification,—

The same reference characters indicate the same parts in all of the figures.

Figure 1:
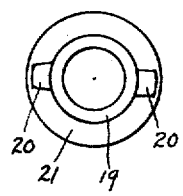
Figure 1 is an end view of the male member of my improved coupling, without the pressure-applying head hereinafter described.
Figure 2:
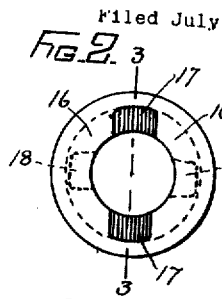
Figure 2 is an end view of the female member.
Figure 3:
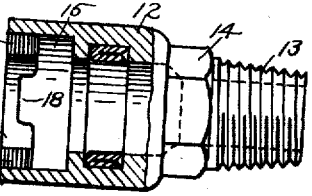
Figure 3 is a section on line 3—3 of Figure 2.

12 represents the tubular female member of the coupling, said member having at one end portion means for connection with a conduit section. As here shown, the member 12 is provided with an externally screw-threaded nipple 13, and a hexagonal wrench-engaging portion 14, whereby the member may be turned to screw the nipple 13 into an internally-threaded fixed conduit section. It is obvious, however, that the member 12 may be provided with means for connection with a length of hose.

The bore of the member 12 is provided with an annular enlargement 15, and with spaced apart segmental ribs 16 in the outer portion of said enlargement. The ends of said ribs are spaced apart to form longitudinal slots 17, communicating with the portion of the enlargement 15 behind the ribs. The inner sides of the ribs 16 are provided with recesses 18, opening into the bore enlargement 15.

19 represents the male member having an entering portion, provided with oppositely projecting studs 20, adapted to be passed through the longitudinal slots 17 by an endwise movement of the male member, and to be moved laterally in the bore enlargement 15 by partial rotation of the male member into position to enter the recesses 18.

The male member is provided with pressing means, adapted to bear on the outer end of the female member, and automatically force the studs 20 backward into the recesses 18, so that the male member may be interengaged with the female member by two manual movements, namely, a longitudinal movement and a partial rotary movement of the male member, followed by an automatic backward movement caused by the said pressing means.

I prefer to embody the pressing means as next described.

Figure 8:
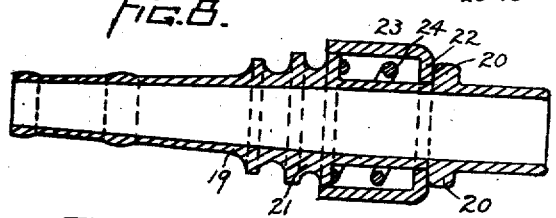
Figure 8 is a section on line 8—8 of Figure 7.
Figure 7:
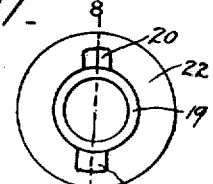
Figure 7 is an end view of the male member, and the pressure-applying head thereon.

On the male member, at the rear end of the entering portion thereof, is formed an annular enlargement 21, which is spaced from the studs 20, and constitutes a spring abutment and a guide. Mounted to move on the male member, between said enlargement and studs is a pressure-applying annular head 22, formed to abut against the outer end of the female member. Said head is provided with an annular flange 23, which is movable on and guided by the annular enlargement 21, said head, flange, and enlargement forming an annular spring chamber surrounding the male member. A helical spring 24, surrounding the male member, is interposed between the enlargement 21 and head 22, and normally holds the head in yielding contact with the studs 20, as shown by Figure 8. The head constitutes a loose abutment for one end of the spring, and prevents contact of the spring with the studs 20.

Figure 5:
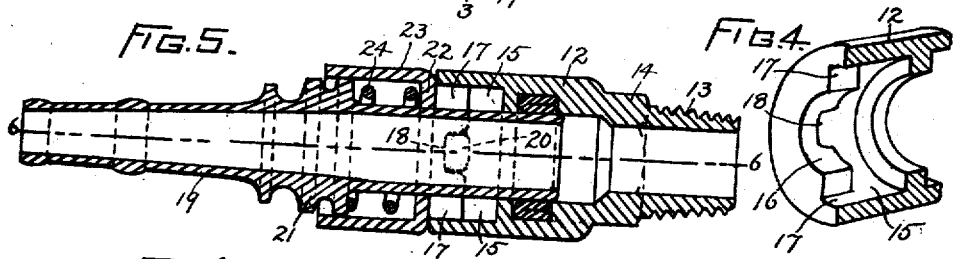
Figure 5 is a longitudinal section, showing the two members interengaged.
Figure 4:
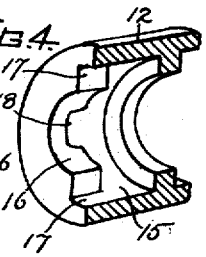
Figure 4 is a perspective sectional view, showing a portion of the female member.
Figure 6:
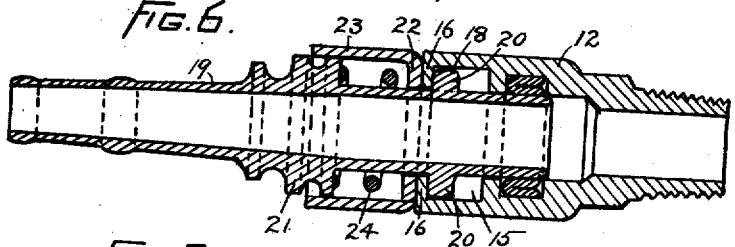
Figure 6 is a section on line 6—6 of Figure 5.

When the male member is inserted in the female member, the head 22 is forced by its contact with the female member from the position shown by Figure 8, the flange 23 sliding on the guiding enlargement 21 until the studs 20 enter the bore enlargement 15. When the male member is turned to register the studs 20 with the recesses 18, the compressed spring 24 acts through the head 22 to force the male member endwise, and cause the studs 20 to enter the recesses 18, as indicated by Figures 5 and 6.

The two members are now firmly interengaged, so that neither can be rotated relatively to the other, without first applying sufficient pressure to remove the studs 20 from the recesses 18.

The outer end portion of the male member may be formed in any suitable way, for connection with a conduit section, such as a length of flexible hose. The outer sides of the segmental ribs 16 are flush with the outer end of the female member 12, and form therewith an annular end face from which the slots 17 extend to the bore enlargement 15. The outer ends of the slots are therefore exposed on said end face, so that the operation of inserting the studs 20 in the slots is facilitated, the operator being enabled to quickly and conveniently insert the studs in the slots.

It will be seen by reference to Figure 8, that the head 22, and its flange 23 and the spring 24, are inseparably engaged with the male member, the head normally bearing on the studs 20, and the flange at the same time bearing on the enlargement 21. The male member is preferably made as a single casting, which includes the studs 20 and enlargement 21. The head 22 and its flange 23 are also preferably formed as a single casting, the head when in use being an uninterrupted annulus.

Figure 9:
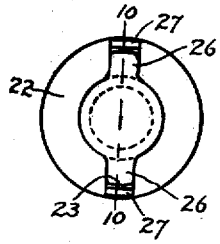
Figure 9 is an end view of the pressure-applying head, as it appears before its engagement with the male member.
Figure 10:
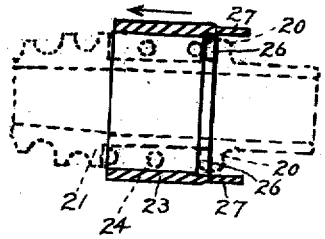
Figure 10 is a section on line 10—10 of Figure 9.
Figure 11:
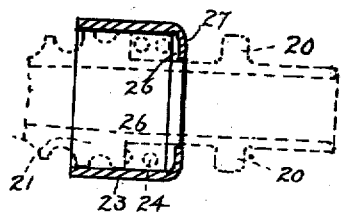
Figure 11 is a view similar to Figure 10, showing the head completed.

To permit the convenient assemblage of the male member, the head 22 and spring 24, I construct the head 22 and its flange 23 as illustrated by Figures 9, 10 and 11.

The said head and flange are originally cast from a suitable malleable metal or alloy, in the form shown by Figures 9 and 10, the head being provided with notches 26, formed and arranged to pass over the studs 20. The casting is provided with ears 27, which, as originally formed, project outwardly from the head, as shown by Figure 10, so that they do not obstruct the notches 26. In assembling the parts, I place the spring 24 on the male member between the studs 20 and enlargement 21, and then move the head 22 and flange 23, when in the condition shown by Figure 10, over the studs 20 in the direction indicated by the arrow in Figure 10, the movement of the head and flange being continued until the head is separated from the studs 20, as indicated by Figure 11. The ears 27 are then bent inward, and caused to fill the notches 17 and thus restore the continuity of the head, which is now incapable of passing over the studs 20.

The head 22 is rotatable on the male member so that it may be turned to move the notches 26 out of alinement with the studs 20 before the ears 27 are bent inward, so that it is not necessary to force the head inwardly from the studs to the extent indicated by Figure 11. In fact, the head may be in contact with the studs, as shown by Figure 8, while the ears are being bent.

The head 22 and its flange 23 constitute a spring cover or housing, enabling a helical spring 24 to be employed and protecting the spring.

The head surrounds the male member and forms a continuous or annular loose abutment for one end of the spring, so that the pressure of the spring is uniformly distributed around the male member, and the end of the spring nearest the studs 20 is prevented from slipping across and being fouled with the studs.

I claim:

1. A hose-coupling comprising a tubular female member having an annular end face, a bore enlargement spaced from the end face by segmental ribs, whose ends are spaced apart to form longitudinal slots extending from the end face to the bore enlargement, the inner sides of said ribs being provided with recesses opening into the enlargement, a tubular male member having an entering portion formed to enter said bore and provided with studs, adapted to be moved forward through said slots, laterally in said enlargement, and backward into said recesses, and with an enlargement spaced from said studs and forming a spring abutment, a helical spring surrounding the entering portion between the said abutment and studs, and seated at one end on said abutment, and an annular head loosely surrounding the entering portion and interposed between the opposite end of said spring and the said studs, said head having at the end adjacent the female member a flanged annular portion which, when the coupling is separated, abuts the studs, and which, when the parts are in coupled relation, abuts and extends across the annular end face of the female member for the purpose described.

2. A hose-coupling substantially as specified by claim 1, the said head being provided with notches adapted to pass over said studs, and with means for closing said notches and rendering the head continuous, the head being rotatable on the male member.

3. A hose-coupling substantially as specified by claim 1, the said head being provided with notches adapted to pass over said studs, and with an annular flange covering said spring and guided by said enlargement, the head being provided with notches adapted to pass over said studs, and with ears which are bent inwardly to close said notches and render the head continuous, the head and flange being rotatable on the male member.

In testimony whereof I have affixed my signature.

CHARLES A. CLAFLIN.